Aug. 21, 1934.  J. C. SHAW ET AL  1,971,121
COMPENSATING MEANS FOR CAM MILLING MACHINES
Filed Dec. 1, 1933   3 Sheets-Sheet 1

INVENTOR.
J.C.Shaw & R.D.Shaw
BY
ATTORNEY

INVENTOR.
J.C. Shaw & R.D. Shaw
ATTORNEY

Patented Aug. 21, 1934

1,971,121

UNITED STATES PATENT OFFICE 1,971,121

COMPENSATING MEANS FOR CAM MILLING MACHINES

John C. Shaw and Robert D. Shaw, Hartford, Conn., assignors to Pratt & Whitney Company, Hartford, Conn., a corporation of New Jersey Application December 1, 1933, Serial No. 700,499

6 Claims. (Cl. 90—13.7)

This application relates to cutting machines for barrel or cylindrical cams. More particularly it relates to a compensating means for moving a cutter relative to a work piece by means of a template during cutting operations permitting accurate formation of the cam surfaces for oscillatory movements of a cam lever, the cam follower comprising laterally spaced rollers at the free end of the lever engaging opposite sides of a circumferential projection on the cam.

This application furthermore relates to a cam cutting machine enabling a thread cam to be accurately formed so that opposite side faces of the cam projection extending about the cylindrical surface of a drum forming the cam may be formed to properly engage laterally spaced rollers of a follower upon its opposite faces in any predetermined oscillated positions of the follower.

Primarily it is an object of the present invention to improve and supplement the construction of cam cutting machine shown and described in Patent No. 1,924,003 entitled Cam cutting machine compensating means, so that the machine shown and described therein may be adapted to cut cylindrical cams having an outstanding circumferential projection thereon the opposite side faces of which form correct roller engaging surfaces providing correct contact therewith for predetermined movements of the lever.

In cutting and in the operation of cams of the cylindrical or drum type in which the cam outline is produced upon an outside cylindrical surface, it has been the practice heretofore to employ a follower having a single roller engaging the cam, the roller being mounted upon the end of a slidably or pivotally mounted arm or lever. In such cams the cam outline is usually in the form of an irregular circumferential groove. The construction shown in the above referred to Patent 1,924,003 enables a cam of the above type to be cut properly compensated for the arcuate movement of the arm or lever carrying a single roller when operating upon a lever arm of any radius. The present invention relates primarily to a still further compensating means for moving the cutting tool slightly relatively to the cam template and the cam blank being formed to enable opposite faces of an irregular circumferential projection upon the cylinder being cut to properly engage a pair of rollers laterally spaced apart and on the free end of a pivotally mounted lever or arm. The rollers engaging the cam projection preferably are symmetrically disposed with respect to the axis of the lever and equally distant therefrom and from the pivot of the lever or arm. When so mounted each roller folows its own cam surface on a side surface of the projection of the cam to give the desired oscillatory movements to the lever arm and at all times will properly contact with its cam surface.

The machine shown and described in connection with this application is designed to cut drum or cylindrical cams of any diameter and adapted for a follower having laterally spaced rollers of any diameter and distance apart which are mounted upon the free end of a pivotally mounted lever of any radius. The machine also employs cam outline and arcuate templates similar in every way to those employed in the above last mentioned patent.

The machine shown in the above referred to Patent 1,924,003 is adapted to form a drum type cam for a follower having a single roll upon the free end of an oscillatory lever of any radius. The present invention adapts the machine shown in the patent above mentioned for cutting cams called thread cams for the type of follower having a pair of spaced rollers on either side of the medium line of a pivotally mounted cam follower.

It will be obvious that with an oscillating cam follower having spaced rollers engaging opposite side surfaces of a circumferential cam projection the form of the cam surfaces for the different rollers will not be exactly similar. This is due to the changing obliquity of the spaced rollers in different oscillated positions of the lever carrying the rollers. In any oblique position of the lever arm or follower one roller is at a different distance above or below the axis of the cam than the other roller. The projected distance between the spaced rollers in a direction parallel to the axis of the cam will vary as the oblique positions of the lever vary so that the cam projection must be of varying thickness, the thickness varying widely as the oblique position of the lever varies.

The machine to which this compensating device is applied provides for movement of the cutting tool vertically and horizontally while a template is simultaneously moved in one of these directions and the cam blank is simultaneously rotated about its axis. The movements are controlled by templates and tracers similar in every way to those shown in the above mentioned Patent 1,924,003, that is the outline template is for a cam follower of zero diameter, and the tracer employed is that shown in Patent 1,694,022.

It is therefore a principal object of the invention to control the vertical and horizontal movements of the cutting tool to first cut one side of a circumferential cam projection on a cylinder for a cam roller laterally disposed from the medial line of a pivotally mounted cam follower and operating on one side of the projection and then to cut the opposite side of the projection for an opposite corresponding laterally spaced cam roller. Between the paths cut out there will remain a continuous but irregular circumferential projection about the cylindrical surface of the drum dependent upon the outline of the cam template and adapted when the drum is rotated to constantly contact with the peripheral surfaces of the rollers.

Finally it is an object of the invention to provide in a machine such as described in the above mentioned patent, means to slightly alter the position of the cutting tool during the cutting operation relative to the tracer contacting with the cam generating template supplementing the movements of the cutting tool as moved by the tracers engaging the outline and arcuate templates.

More specifically this invention comprises a fixture or device which may be applied directly to a machine of the type shown and described in the above mentioned patent. The mechanism may be mounted adjacent the support for the cam template tracer so that, as this tracer is moved horizontally to the left or right to effect corresponding horizontal movements of the cutting tool the horizontal movement of the cutting tool may be slightly increased or decreased as compared to the movement of the tracer. The difference between the distance moved by the cam template tracer and the horizontal movement of tool varies, the difference being greater as the tracer and cutter assume positions representing extreme oscillated positions of the cam follower and less when the position of the lever is intermediate its extreme positions.

With these and other objects in view, our invention includes the features of construction and operation set forth in the following specification and illustrated in the accompanying drawings.

In the accompanying drawings annexed hereto and forming a part of this specification, we have shown our invention embodied in a tracer controlled, electrically operated, automatic cam cutting machine, but it will be understood that the invention can be otherwise embodied and that the drawings are not to be construed as defining or limiting the scope of the invention, the claims appended to this specification being relied upon for that purpose.

In the above mentioned drawings we have shown but one embodiment of the invention which is now deemed preferable, but it is to be understood that changes and modifications may be made within the scope of the appended claims without departing from the spirit of the invention.

Figure 5:
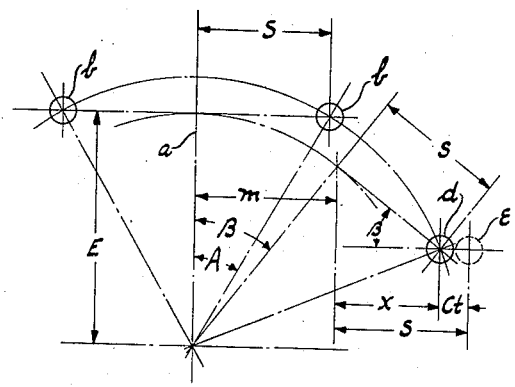
Fig. 5 is a diagrammatic view of a cam follower, one of the cam following rollers being shown in two widely separated positions.

The present invention makes use of a cam outline template corresponding to the desired cam lever movements, the template constituting substantially a draughtsman time chart. The diagram, Fig. 5, shows the necessity for the compensation in the cam cutting machine when using a cam follower having opposite laterally spaced rollers and will be briefly explained. It will be assumed that a pivoted lever arm $a$ has two cam rollers $b$ and $b$ spaced laterally apart at its free end. In order to show the required compensation as an appreciable amount the lever arm $a$ is shown short and the rollers $b$—$b$ widely spaced apart. With the lever arm $a$ in an assumed initial or mid-position one of the rollers $b$ is shown at an angle A from the lever $a$. If the lever arm $a$ is to be moved through an angle B the required position of the right hand roller $b$ must be at $d$. However, the outline template unless some compensating means is employed will place the roller at $e$ for the reason that the template will have that point in its outline corresponding to this position a distance $m$ from that at which the lever arm is in its mid position, and also for the reason that the normal distances of the roller $b$ from the lever arm $a$ has been set off in the initial adjustment of the machine. The horizontal distance $ct$ between these two points $d$ and $e$ is the required compensation.

Referring more in detail to the figures of the drawings, there is illustrated in the drawings a machine generally similar to that shown and described in the above mentioned patent to which reference may be made for a complete description and method of operation. For convenience similar reference characters will be used to designate corresponding parts. As in the cam cutter described in the above mentioned patent, the cylinder A, similar to 25D, forming a cam blank being operated on is rotated upon a fixed horizontal axis. For this purpose there is provided a column 32 rigidly supported upon a machine base 10 and having a horizontally mounted work supporting spindle 24. On this work supporting spindle 24 there is secured a worm wheel 26 preferably disposed within a portion of the column 32 and adapted to be rotated by driving means in every way similar to the means described in the above mentioned patents.

Figure 1:
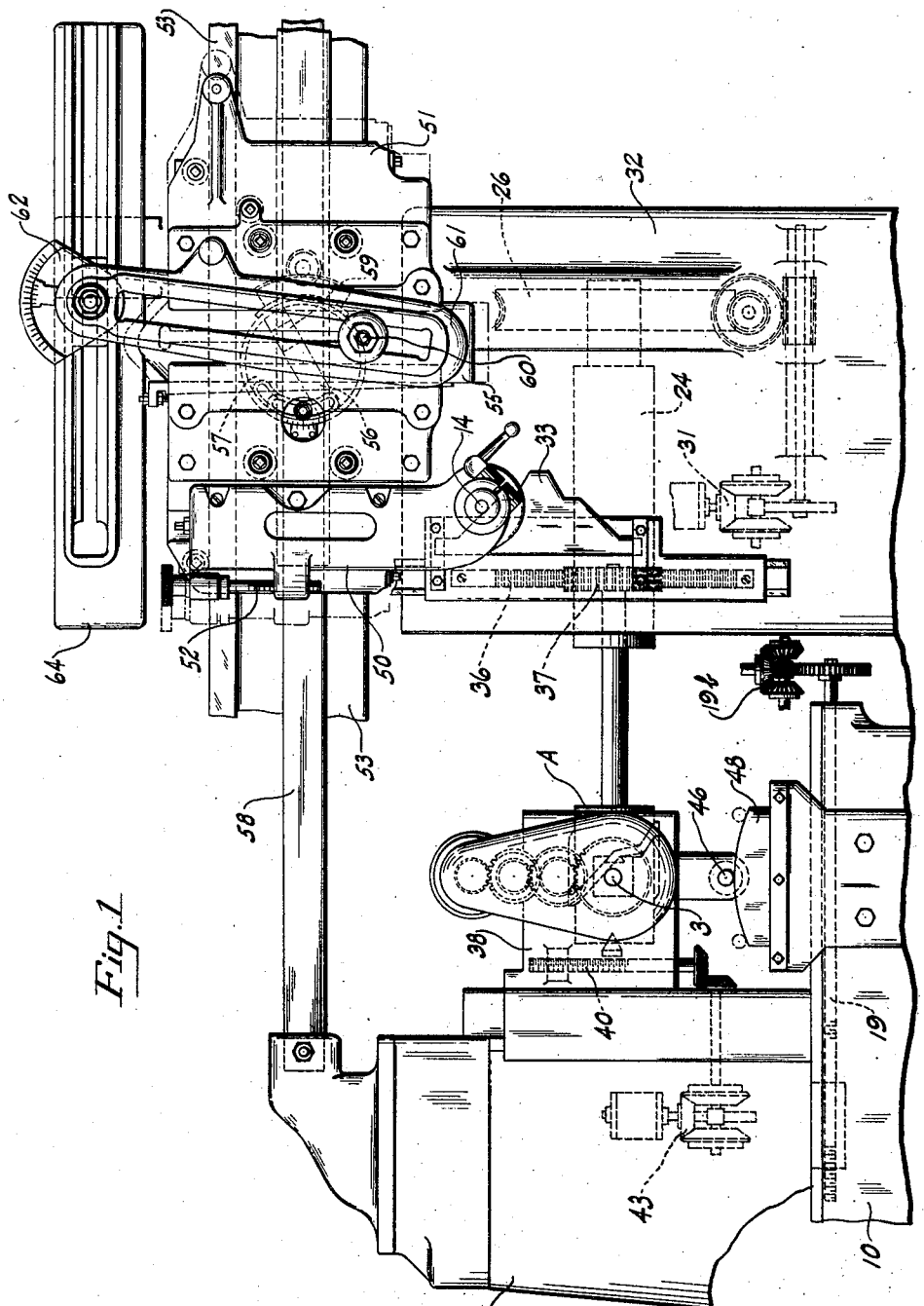
Figure 1 is a front elevation of a complete cam cutting machine to which the compensating device forming the present invention is applied.
Figure 2:
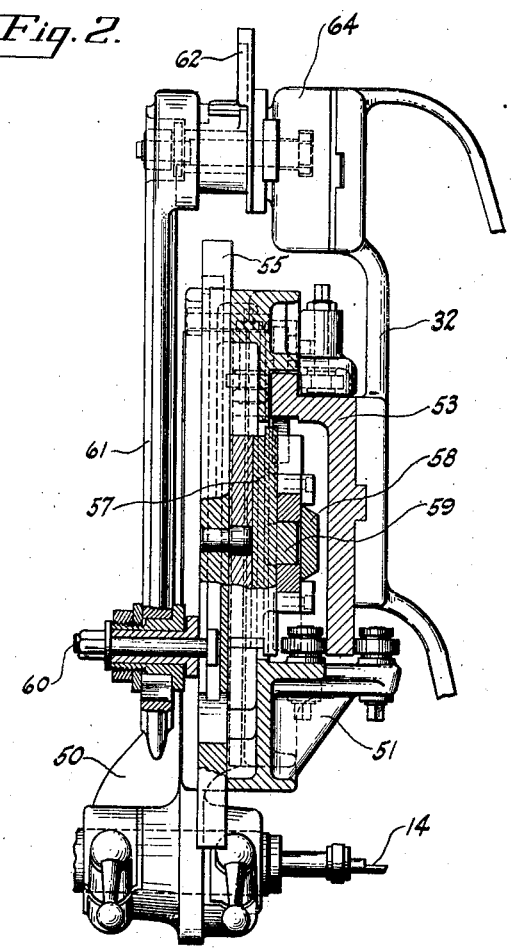
Fig. 2 is a side elevation of the compensating device apart from the machine, parts being shown in section.
Figure 3:
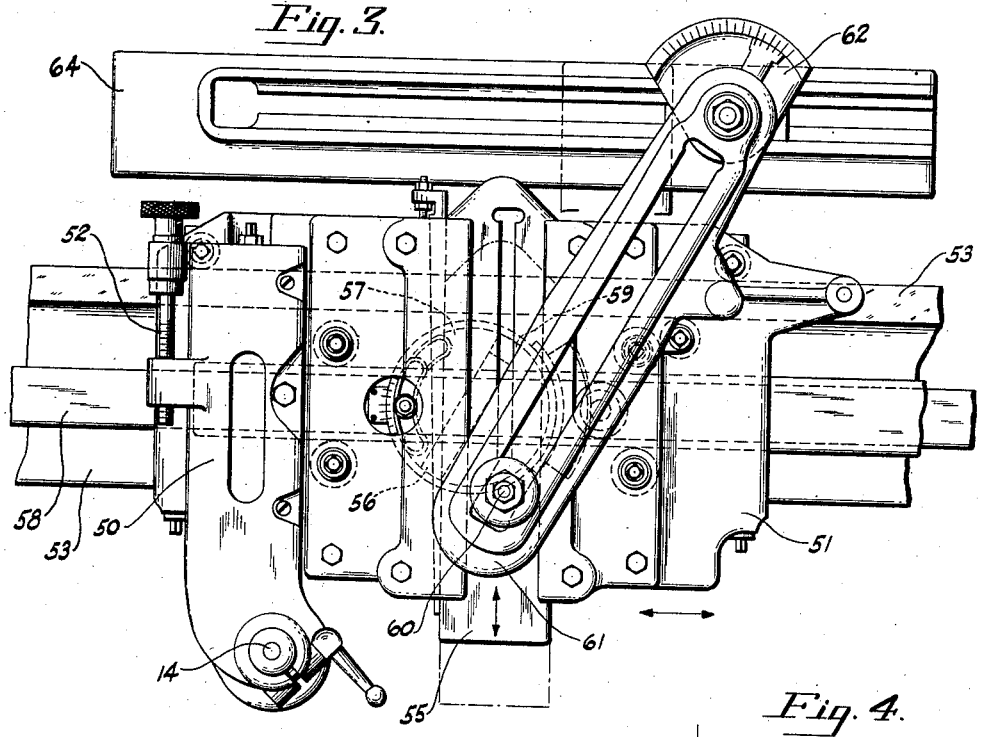
Fig. 3 is an enlarged front elevation of the compensating device, parts being shown in a different operative position.

Also secured on the work supporting and rotating spindle 24 is a spur gear 37 meshing with a vertically movable rack 36 slidably supported within one side of the column 32 and fixed to this rack is a cam template 33. This cam template is in every way similar to that shown and described in the above mentioned patent and has one side edge formed to represent a development of the desired path of movement of the cam follower as described above. Rotation of the spindle 24 and the cam cylinder A will effect vertical movement of the cam template 33 in timed relation therewith. As shown in Fig. 1 the rack 36 is secured directly upon the rear surface of the vertically movable slide supported within the column 32. Detachable fastening means on the front surface of the slide 34 enable different templates to be readily mounted and dismounted.

The worm gear 26 through driving connections and electromagnetic clutches 31 slowly rotates the spindle 24 and the cam blank cylinder A, this movement preferably being a step-by-step movement controlled by tracer 14 associated with the column 32 and horizontally positioning the cutting tool through mechanism presently to be more fully described. Adapted to engage and cut the surface of the cylinder A during rotation of the cylinder is a cutting tool 3 mounted within a movable head 38 slidably supported on a side face of a column 2 for vertical movement. The column 2 is mounted for horizontal movement on the base 10 in a direction parallel to the axis of the spindle 24 by means of a screw 19 rotated in opposite directions through driving connections and suitable electromagnetic clutches. The horizontally movable member in the above mentioned patent, movement of which causes the cutting tool 3 to operate throughout the length of the cylinder A, is the work support instead of the tool supporting column 2. It will be understood, however, that this is in every way equivalent to movement in a similar direction of column 2. This movement in the present construction advances the cutting tool along elements of the cylinder A, the cylinder A being fixed against endwise movement.

Movement of the cutting tool 3 is effected by means of tracer 14 engaging the cam outline of the template 33 in the same manner as the corresponding tracer of the patent above mentioned controls the horizontal position of the work support. The tracer 14 instead of being mounted for horizontal movement directly with the column 2 mounting the cutter 3 is so mounted that the tracer 14 has a slightly different horizontal movement toward or away from the column 2 supplemental to its movement with the column. It is this supplemental movement that effects the desired compensation to adapt the machine for cutting thread cams for cam followers having laterally spaced rollers upon the free end of a pivotal arm. The compensating movement is such that the cutting tool 3 is moved in the path that will be traversed by the rollers in operating the cam. This motion is induced by the compensating means and controlled by a cam outline template identical to one for a single roller follower. The tracer 14 and the compensating means operate slidably in a direction axially of the cam being cut.

The cutter 3, as stated above, is rotatably mounted within a head 38 and preferably is mounted within the forward end of a spindle rotatably mounted within a slide suitably supported within this head for movement toward and from the axis of work spindle 24. The head 38 is directly mounted upon the column 2 and may be raised and lowered thereon by an elevating screw 40 rotated in opposite directions by electromagnetic clutches 43, the mechanism for controlling these clutches being similar to that shown and described in the above referred to patents. The magnetic clutches 43 are controlled by tracer 46 mounted on a lower extension of the head 38 and cooperating with an arcuate template 48 fixed to the base 10. The column 2 and the head 38 are so mounted that the axis of the cutter 3 is substantially normal to the axis of the spindle 24. The cutter head 38 moves in a plane normal to the spindle 24, the axis of the cutter 3 passing above and below the horizontal axis of the work spindle 24. The cutter 3 also moves parallel to the axis of work spindle 24 by movement of the column 2. As the operation of this tracer 46 and its template 48 controlling the vertical positions of the head 38 and cutter 3 is fully shown and described in the above mentioned patent, further description is not thought to be necessary. It will suffice to state that the arc of template 48 corresponds in radius to the arc of movement of the cam follower to be used with the cam being made.

The rotation of the spindle 24 by clutches 31 and connections therefrom to the worm wheel 26, the vertical movement of the head 38 through the clutches 43 as controlled by tracer 46 and also the horizontal movement of the column 2 horizontrlly by the clutches 19ᵇ and tracer 14 are all coordinated in the same manner as in the above mentioned patent. The means therefor are fully disclosed in the said patent to which reference may be had for a full description.

Referring now to the specific mechanism forming the novel compensating means it will be seen that the bracket 50 supporting the tracer 14 is mounted upon a horizontally movably slide 51. Preferably and as shown in Fig. 1, the bracket 50 may be vertically adjustable on the slide 51 to position the tracer 14 properly relative to the template 33. For that purpose an adjusting screw 52 is mounted within the slide 51 engaging a threaded portion of the bracket 50. The tracer 14 may thus be raised or lowered to preliminarily adjust the mechanism for different cam outline templates. The slide 51 is preferably supported upon ways 53 provided upon the column 32 for easy movement in a direction parallel to the axis of the cam being cut.

Vertically movable within a central guideway in the slide 51 is a vertically disposed supplementary slide 55 to which is pivotally attached a block 59 slidable with a diametrical groove or slot 56 in a rotatably adjustable member 57 of disc or plate form. This rotatable member or disc 57 is attached adjustably to a horizontally movable bar or rod 58 slidably mounted within the main slide 51 parallel to the ways 53 supporting the main slide 51. The outer end of this bar or rod 58 is attached rigidly to a fixed extension mounted directly on the upper portion of the column 2. From the above described construction it will be seen that horizontal movements of the main slide 51 by movements induced to the tracer 14 by the template 33 will effect movement of the column 2 on which the cutting tool 3 is mounted thus imparting horizontal movements of the cutting tool 3 axially of the cam blank. Also if the groove 56 of the rotatable member 57 is adjusted to its vertical position no relative movement between the main slide 51 and the rod or bar 58 will take place. The cutting tool 3 therefore moves horizontally a distance exactly equal to any movement of the main slide 51 regardless of vertical movement of the supplementary slide 55. However, with the rotatable member 59 adjusted so that the groove 56 is oblique and with vertical movement of the block 59 the distance moved horizontally by the cutting tool 3 will be slightly greater or less than movement of the main slide 51 and tracer 14 dependent upon the amount of vertical movement of the supplemental slide 55 and the oblique disposition of the groove 56.

To impart vertical movements to the supplemental slide 55 a stud 60 outstanding therefrom and preferably adjustably positioned along the slide 55 is pivotally engaged by one end of a link 61 the opposite end of which is pivotally mounted in a bracket 62 adjustably positioned in ways within a fixed extension 64 above the column 32.

Figure 4:
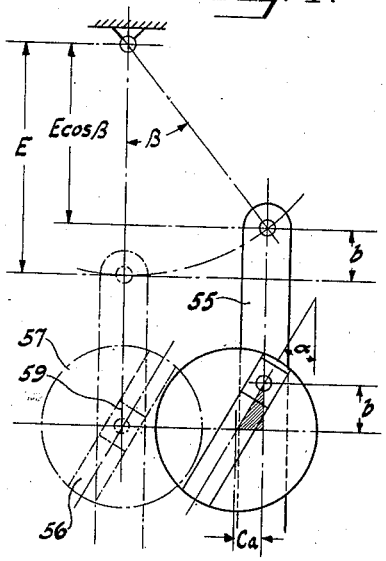
Fig. 4 is a diagrammatic view showing different positions of the linkage assumed during use of the cam cutting machine.

The diagram, Fig. 4, showing the compensating linkage in its simplest form indicates how the tracer point can be moved a slight distance toward or from the cutting tool 3. The link 61 corresponding in length to the length of the lever arm $a$ is pivoted to the base 10 of the machine. This link 61 elevates a vertical member or slide 55 when oscillated in either direction. The member 55 is slidably mounted for movement vertically only within the horizontally movable slide 51 and carries the block 59 movable within a slot 56 the angular position of which may be adjusted by rotation of the disc 57. The angular position of the slot 56 is adjusted to correspond exactly to the angular spacing of the cam roller $b$ from the lever arm $a$, that is, at an angle A. The block 59 by elevation of the member 55 and the oblique position of its slot 56 is moved along the slot and necessitates horizontal movement of the plate into which the slot is cut and also requires movement of the rod 58. The distance moved by the rod 58 relative to the slide or carriage 51 is the required compensation. It is to the block 59 movable within the slot in the adjustable plate or disc 57 and its mounting member 55 and the slide 51 that the tracer 14 for the outline template 33 is mounted for horizontal movement therewith.

To set the compensating device for any particular cam operated lever $a$ and follower it is only necessary to set the distance between the pivots on the swinging arm or link 61 to equal the length of the lever arm $a$ with which the cam is to be used. Also it is necessary to set the plate like member 57 so that the slot 56 will be at an angle A to the vertical, this angle as indicated in Fig. 5 being equal to the angular distance of a cam follower $b$ from the axis of the lever $a$. The block or bracket 62 supporting the upper pivot about which the arm 61 oscillates is so located that the arm 61 will swing back and forth through the same angles as the lever arm carrying the cam rollers. Usually this swinging movement is symmetrical on either side of its vertical axis.

With the parts of the compensating device in adjusted position the cutting tool 3 is located relative to the cam blank A at a position corresponding to the starting point of the outline template 33. The arcuate template 48 is positioned and the head 38 supporting the cutting tool is positioned as described in the patent to Shaw above mentioned. So adjusted the machine may be operated to cut one side of the cam projection on the drum or cylinder A. When this side of the projection is completed the mechanism and machine are again adjusted. This second adjustment corresponds to that above described but is for the opposite cam roller so that the position of the disc member 57 will be changed and the position of the cutting tool 3 axially of the cylinder A and the position of the tracer 46 on template 48 will be correspondingly changed. It will be understood that graduations will be provided on the lever 61 and about the periphery of the member 57 to facilitate adjustment of these members.

What we claim is:

1. A compensating device for cam cutting machines comprising in combination, a base, supporting and rotating means for a cam blank thereon, a template conforming to a development of the desired cam path mounted on said base for movement in timed relation to said cam blank, a template fixed to the base having an outline corresponding to the path of movement of the cam follower, tracers contacting with said templates, a cutting tool movable in planes normal to each other one of which is parallel to the axis of the cam blank, said movements being controlled by said tracers and templates, and means to vary the distance between the tracer following said outline template and the tool in a direction parallel to the axis of the cam blank as said tool moves to the right and left of its mid position.

2. A compensating device for cam cutting machines comprising in combination, a base, cam blank supporting and rotating means thereon, a cutting tool mounted for operation on said cam blank, means to relatively move said cam blank and tool axially of each other during rotation of said cam blank, templates having tracers in contact therewith for controlling movements of said tool during the cutting operation, linkage connecting one of said tracers to said tool whereby relative axial movement of said tool and cam blank by one of said templates will be varied by said linkage in different portions of its travel.

3. A compensating device for cam cutting machines comprising in combination, a base, cam blank supporting and rotating means thereon, a cutting tool mounted for operation on said cam blank, means to relatively move said cam blank and tool axially of each other during rotation of said cam blank, templates having tracers in contact therewith for controlling movements of said tool during the cutting operation, linkage connecting one of said tracers to said tool whereby relative axial movement of said tool and cam blank by one of said templates will be varied by said linkage in different portions of its travel, and means to adjust said linkage to vary the amount of motion between the tracer and the tool induced thereby.

4. A compensating device for cam cutting machines comprising in combination, a base, cam blank supporting and rotating means thereon, a cutting tool mounted for operation on said cam blank, means to relatively move said cam blank and tool axially of each other during rotation of said cam blank, a template corresponding in outline to the desired cam path, an arcuate template corresponding to the arc of movement of the cam follower, tracers in contact with said templates for controlling movements of said tool during the cutting operation, linkage connecting the tracer for the cam outline template to said tool whereby relative axial movement of said tool and cam blank by said outline template will be varied by said linkage in different portions longitudinally of said cam blank.

5. A compensating device for cam cutting machines comprising in combination, a base, supporting and rotating means for a cam blank thereon, a template conforming to the desired cam path mounted on said base for movement in timed relation to said cam blank, a template fixed to the base having an outline corresponding to the path of movement of the cam follower, tracers contacting with said templates, a cutting tool movable in planes normal to each other one of which is parallel to the axis of the cam blank, said movements being controlled by said tracers and templates, and linkage connecting the cutter and the cam outline template, said linkage including an interconnected lever and angularly adjustable plate whereby the distance between the tracer for the outline template and the tool axially of the cam blank is varied as the tool moves to the right and left.

6. A compensating device for cam cutting machines comprising in combination, a base, supporting and rotating means for a cam blank thereon, a template conforming to the desired cam path mounted on said base for movement in timed relation to said cam blank, a template fixed to the base having an outline corresponding to the path of movement of the cam follower, tracers contacting with said templates, a cutting tool movable in planes normal to each other one of which is parallel to the axis of the cam blank, said movements being controlled by said tracers and templates, linkage connecting the cutter and the cam outline template, said linkage including an interconnected lever and angularly adjustable plate whereby the distance between the tracer for the outline template and the tool axially of the cam blank is varied as the tool moves to the right and left, and means to vary the effective length of said lever and the angular adjustment of said plate.

JOHN C. SHAW.
ROBERT D. SHAW.